United States Patent
Matsuyama

(10) Patent No.: US 8,595,745 B2
(45) Date of Patent: Nov. 26, 2013

(54) JOB-PROCESS SWAPPING BETWEEN MULTIPLE STORAGE DEVICES BASED ON THE MOST RECENTLY EXECUTED TYPE OF A PROCESS AND HISTORICAL EXECUTION COUNT AMONG PLURAL TYPES OF PROCESSES

(75) Inventor: Yoichi Matsuyama, Yokohama (JP)

(73) Assignee: Canon Kabushiki Kaisha (JP)

( * ) Notice: Subject to any disclaimer, the term of this patent is extended or adjusted under 35 U.S.C. 154(b) by 719 days.

(21) Appl. No.: 12/722,241

(22) Filed: Mar. 11, 2010

(65) Prior Publication Data

US 2011/0010722 A1 Jan. 13, 2011

(30) Foreign Application Priority Data

Mar. 12, 2009 (JP) ................................. 2009-059420

(51) Int. Cl.
G06F 9/46 (2006.01)
G06F 7/38 (2006.01)
G06F 13/00 (2006.01)
G06K 15/00 (2006.01)

(52) U.S. Cl.
USPC ........... 718/107; 718/102; 718/100; 711/159; 711/160; 358/1.16; 358/1.17; 712/241

(58) Field of Classification Search
None
See application file for complete search history.

(56) References Cited

U.S. PATENT DOCUMENTS

| 4,179,737 A * | 12/1979 | Kim .............................. 712/241 |
| 7,565,340 B2 * | 7/2009 | Herlocker et al. .............. 706/52 |
| 7,571,446 B2 * | 8/2009 | Seki et al. ...................... 719/330 |

FOREIGN PATENT DOCUMENTS

| JP | 03-192446 A | 8/1991 |
| JP | 05-088984 A | 4/1993 |
| JP | 2004-227188 A | 8/2004 |
| WO | 2008026142 A1 | 3/2008 |

OTHER PUBLICATIONS

JP OA issued Aug. 6, 2013 for corres. JP 2009-059420.

* cited by examiner

Primary Examiner — Meng An
Assistant Examiner — Bing Zhao
(74) Attorney, Agent, or Firm — Rossi, Kimms & McDowell LLP

(57) ABSTRACT

A memory swap management method that can preferentially place in a primary storage device a process that has a high possibility of being executed next, thereby shortening the time to start executing the next process. A planned execution sequence of jobs is stored when there are a plurality of jobs waiting to be executed. A process as a swap-out candidate and a process as a swap-in candidate are determined based on the execution sequence and types of processes stored in the primary storage device. According to the determination, the process as the swap-out candidate is swapped out from the primary storage device to a secondary storage device, and the process as the swap-in candidate is swapped in from the secondary storage device into an area of the primary storage device freed as a result of the swap-out.

7 Claims, 14 Drawing Sheets

FIG.4

JOB PROCESS TABLE — 401

| JOB NAME | PROCESS NAME | EXECUTION SEQUENCE |
|---|---|---|
| COPY | SCAN PROCESS | SCAN → PRINT → IMAGING |
| | PRINT PROCESS | |
| | IMAGING PROCESS | |
| PDL PRINT | PRINT PROCESS | PRINT → IMAGING → RENDERING |
| | IMAGING PROCESS | |
| | RENDERING PROCESS | |
| SCAN | SCAN PROCESS | SCAN |
| FAX | SCAN PROCESS | (SEND) SCAN → NETWORK (RECEIVE) NETWORK → PRINT |
| | PRINT PROCESS | |
| | NETWORK PROCESS | |

FIG.5

| SEQUENCE | JOB QUEUE | EXECUTION SEQUENCE OF CORRESPONDING PROCESSES |
|---|---|---|
| 1 | PDL PRINT | PRINT → IMAGING → RENDERING |
| 2 | COPY | SCAN → PRINT → IMAGING |
| 3 | FAX TRANSMISSION | SCAN → NETWORK |
| 4 | SCAN | SCAN |
| 5 | FAX TRANSMISSION | SCAN → NETWORK |
| 6 | COPY | SCAN → PRINT → IMAGING |
| 7 | FAX TRANSMISSION | SCAN → NETWORK |

FIG.6

| MOST RECENTLY EXECUTED PROCESS | PROCESS EXECUTED NEXT ||||| 
|---|---|---|---|---|---|
| | PRINT | IMAGING | RENDERING | SCAN | NETWOK |
| PRINT | 5 | 10 | 0 | 1 | 1 |
| IMAGING | 5 | 0 | 10 | 7 | 1 |
| RENDERING | 5 | 0 | 0 | 7 | 1 |
| SCAN | 10 | 0 | 0 | 1 | 2 |
| NETWOK | 10 | 0 | 0 | 7 | 1 |

| PROCESS NAME | VIRTUAL ADDRESS | CORRESPONDING REAL ADDRESS | INFORMATION | PRIORITY |
|---|---|---|---|---|
| PRINT PROCESS | 0x10001000 | ABSENT | SEGMENT ID#1 | 1 |
| SCAN PROCESS | 0x10002000 | PRESENT | 0x0000 | 1 |
| IMAGING PROCESS | 0x10003000 | PRESENT | 0x1000 | 1 |
| RENDERING PROCESS | 0x10004000 | ABSENT | SEGMENT ID#2 | 1 |
| NETWORK PROCESS | 0x10005000 | ABSENT | SEGMENT ID#3 | 1 |

| PROCESS NAME | VIRTUAL ADDRESS | CORRESPONDING REAL ADDRESS | INFORMATION | PRIORITY |
|---|---|---|---|---|
| PRINT PROCESS | 0x10001000 | PRESENT | 0x1000 | 1 |
| SCAN PROCESS | 0x10002000 | PRESENT | 0x0000 | 1 |
| IMAGING PROCESS | 0x10003000 | ABSENT | SEGMENT ID#4 | 1 |
| RENDERING PROCESS | 0x10004000 | ABSENT | SEGMENT ID#2 | 1 |
| NETWORK PROCESS | 0x10005000 | ABSENT | SEGMENT ID#3 | 1 |

800

| JOB NAME | EXECUTION SEQUENCE | SEQUENCE OF APPEARANCE |
|---|---|---|
| COPY | SCAN → PRINT → IMAGING | 2 |
| PDL PRINT | PRINT → IMAGING → RENDERING | 1 |
| SCAN | SCAN | 4 |
| FAX TRANSMISSION | SCAN → NETWORK | 3 |
| FAX RECEPTION | NETWORK → PRINT | |

FIG.13A

| PROCESS | PRINT | NETWORK | SCAN | RENDERING | IMAGING |
|---|---|---|---|---|---|
| FREQUENCY | 10 | 2 | 1 | 0 | 0 |

| SWAP-IN PROCESS | PRINT |
|---|---|
| SWAP-OUT PROCESS | IMAGING |

| PROCESS | PRINT | NETWORK | SCAN | RENDERING | IMAGING |
|---|---|---|---|---|---|
| FREQUENCY | 9 | 9 | 8 | 0 | 0 |

| SWAP-IN PROCESS | SCAN | NETWORK |
|---|---|---|
| SWAP-OUT PROCESS | IMAGING | RENDERING |

FIG.14A

| SWAP-IN PROCESS | PRINT | IMAGING | ~1301 |
|---|---|---|---|
| SWAP-OUT PROCESS | NETWORK | SCAN | |

| PROCESS NAME | VIRTUAL ADDRESS | CORRESPONDING REAL ADDRESS | INFORMATION | PRIORITY |
|---|---|---|---|---|
| PRINT PROCESS | 0x10001000 | ABSENT | SEGMENT ID#1 | 1 |
| SCAN PROCESS | 0x10002000 | PRESENT | 0x0000 | 1 |
| IMAGING PROCESS | 0x10003000 | ABSENT | SEGMENT ID#3 | 1 |
| RENDERING PROCESS | 0x10004000 | ABSENT | SEGMENT ID#2 | 1 |
| NETWORK PROCESS | 0x10005000 | PRESENT | 0x1000 | 1 |

| PROCESS NAME | VIRTUAL ADDRESS | CORRESPONDING REAL ADDRESS | INFORMATION | PRIORITY |
|---|---|---|---|---|
| PRINT PROCESS | 0x10001000 | PRESENT | 0x1000 | 1 |
| SCAN PROCESS | 0x10002000 | ABSENT | SEGMENT ID#5 | 1 |
| IMAGING PROCESS | 0x10003000 | PRESENT | 0x0000 | 1 |
| RENDERING PROCESS | 0x10004000 | ABSENT | SEGMENT ID#2 | 1 |
| NETWORK PROCESS | 0x10005000 | ABSENT | SEGMENT ID#4 | 1 |

JOB-PROCESS SWAPPING BETWEEN MULTIPLE STORAGE DEVICES BASED ON THE MOST RECENTLY EXECUTED TYPE OF A PROCESS AND HISTORICAL EXECUTION COUNT AMONG PLURAL TYPES OF PROCESSES

BACKGROUND OF THE INVENTION

1. Field of the Invention

The present invention relates to a memory swap management method and apparatus that virtually store processes using a primary storage device and a secondary storage device in an information processing apparatus that executes jobs comprised of processes, as well as a computer-readable storage medium storing a program for implementing the method.

2. Description of the Related Art

Conventionally, there has been known a memory swap management method that uses a virtual storage system and controls swapping of memory areas in information processing apparatuses such as a multifunctional peripheral having a variety of functions such as copying, printing, and faxing.

In the method using the virtual storage system, a memory area not less than the memory capacity of real memory in a primary storage device can be managed using a secondary storage device. In a case where a memory area not less than the memory capacity of real memory is used, swap processing is carried out in which contents of the memory area are temporarily saved (swapped out) in a storage area of, for example, an HDD (hard disk drive) as the secondary storage device. The swap processing requires data transfer between real memory and an HDD, and hence when the swap processing occurs, the start of execution of the next process is delayed due to the swap processing.

Thus, as an improvement to make the swap processing more efficient, a method in which a plurality of pages are collectively swapped out according to an active state of pages at swap-out of a process is disclosed in Japanese Laid-Open Patent Publication (Kokai) No. H05-88984.

Also, conventionally, there has been the problem that when a process swapped out once from real memory is required to run again, response is not good because it takes time to swap the process into the real memory.

To cope with this problem, there is scope for considering the following attempt so as to realize good response of a process to be executed next. First, information on swapped-out areas is managed in list form. Then, when there is a free space in the real memory while a system is idling, processes are sequentially swapped in from a most recently swapped out process so as to realize good response of a process to be executed next.

According to the method disclosed in Japanese Laid-Open Patent Publication (Kokai) No. H05-88984, however, swapping may frequently occur during execution of processes, and hence a time to start executing a process cannot be shortened although a time can be shortened by combining a plurality of swap-out processes.

Moreover, in the attempt being considered as described above, a most recently swapped out process does not always have a high possibility of being executed next. For this reason, it is highly likely that at a time of execution of a process, swap processing occurs with the process being not present in the real memory, which is not efficient.

Incidentally, in information processing apparatuses such as multifunctional peripherals, functions such as copying, printing, faxing, and scanning are executed as jobs according to instructions as distinct from general-purpose PCs (personal computers). In execution of each job, only processes constituting the job are executed. Conventionally, even in such an environment in which only specific processes are frequently executed according to a status of use by a user, optimization of swap processing according to the status of use by the user has not been practiced. For this reason, particularly in apparatuses of this type, there is scope for improvement in inhibiting occurrence of swap processing immediately before execution of a job and thus increasing a processing speed of the apparatus.

SUMMARY OF THE INVENTION

The present invention provides a memory swap management method and apparatus that can preferentially place in a primary storage device a process that has a high possibility of being executed next, thereby shortening a time to start executing the next process, as well as a computer-readable storage medium storing a program for implementing the method.

Accordingly, in a first aspect of the present invention, there is provided a memory swap management method that in an information processing apparatus that executes a job comprising at least one process, carries out virtual storage of the process using a primary storage device and a secondary storage device, comprising a storage step of storing a planned execution sequence of jobs when there are a plurality of jobs waiting to be executed in the information processing apparatus, a determination step of determining a process as a swap-out candidate and a process as a swap-in candidate based on the planned execution sequence of the jobs waiting to be executed and types of processes stored in the primary storage device, and a swap processing step of, according to the determination in said determination step, swapping out the process as the swap-out candidate from the primary storage device to the secondary storage device, and swapping in the process as the swap-in candidate from the secondary storage device into an area of the primary storage device freed as a result of the swap-out.

Accordingly, in a second aspect of the present invention, there is provided a memory swap management method that in an information processing apparatus that executes a job comprising at least one process, carries out virtual storage of the process using a primary storage device and a secondary storage device, comprising a recording step of recording an execution history of processes, a predicting step of predicting, with respect to each process, a possibly of being executed next based on the execution history of processes recording in said recording step and a type of a most recently executed process, a determination step of determining a process as a swap-out candidate and a process as a swap-in candidate based on the possibilities predicted in said predicting step, and a swap processing step of, according to the determination in said determination step, swapping out the process as the swap-out candidate from the primary storage device to the secondary storage device, and swapping in the process as the swap-in candidate from the secondary storage device into an area of the primary storage device freed as a result of the swap-out.

Accordingly, in a third aspect of the present invention, there is provided a memory swap management apparatus that in an information processing apparatus that executes a job comprising at least one process, carries out virtual storage of the process using a primary storage device and a secondary storage device, comprising a storage unit adapted to store a planned execution sequence of jobs when there are a plurality of jobs waiting to be executed in the information processing apparatus, a determination unit adapted to determine a process as a swap-out candidate and a process as a swap-in candidate based on the planned execution sequence of the jobs waiting to be executed and types of processes stored in the primary storage device, and a swap processing unit adapted to, according to the determination by said determination unit, swap out the process as the swap-out candidate from the primary storage device to the secondary storage device, and swap in the process as the swap-in candidate from the secondary storage device into an area of the primary storage device freed as a result of the swap-out.

Accordingly, in a fourth aspect of the present invention, there is provided a memory swap management apparatus that, in an information processing apparatus that executes a job comprising at least one process, carries out virtual storage of the process using a primary storage device and a secondary storage device, comprising, a recording unit adapted to record an execution history of processes, a predicting unit adapted to predict, with respect to each process, a possibly of being executed next based on the execution history of processes recording by said recording unit and a type of a most recently executed process, a determination unit adapted to determine a process as a swap-out candidate and a process as a swap-in candidate based on the possibilities predicted by said predicting unit, and a swap processing unit adapted to, according to the determination by said determination unit, swapping out the process as the swap-out candidate from the primary storage device to the secondary storage device, and swapping in the process as the swap-in candidate from the secondary storage device into an area of the primary storage device freed as a result of the swap-out.

Accordingly, in a fifth aspect of the present invention, there is provided a computer-readable storage medium storing a program for causing a computer to execute a memory swap management method.

Accordingly, in a sixth aspect of the present invention, there is provided a computer-readable storage medium storing a program for causing a computer to execute a memory swap management method.

According to the present invention, a process that constitutes a job to be executed next and has a high possibility of being executed next is preferentially placed in the primary storage device, so that the time to start executing the next process is started can be shortened.

Moreover, according to the present invention, a process that has a high possibility of being executed next is preferentially placed in the primary storage device, so that the time to start executing the next process is started can be shortened.

Further features of the present invention will become apparent from the following description of exemplary embodiments (with reference to the attached drawings).

BRIEF DESCRIPTION OF THE DRAWINGS

FIG. 4 is a view showing a job process table.

FIG. 5 is a view showing an exemplary job queue.

FIG. 6 is a view showing an exemplary process execution history table in an initial state.

FIGS. 8A and 8B are diagrams showing exemplary process memory management tables before updating (FIG. 8A) and after updating (FIG. 8B).

FIGS. 13A to 13D are views showing a process execution frequency table (FIGS. 13A and 13C) and a swap target process table (FIGS. 13B and 13D).

FIGS. 14A to 14C are views showing a swap target process table (FIG. 14A), an exemplary process memory management table in a state in which a fax transmission job was most recently executed (FIG. 14B), and an exemplary updated process memory management table (FIG. 14C).

DESCRIPTION OF THE EMBODIMENTS

The present invention will now be described in detail with reference to the drawings showing an embodiment thereof.

Figure 1:
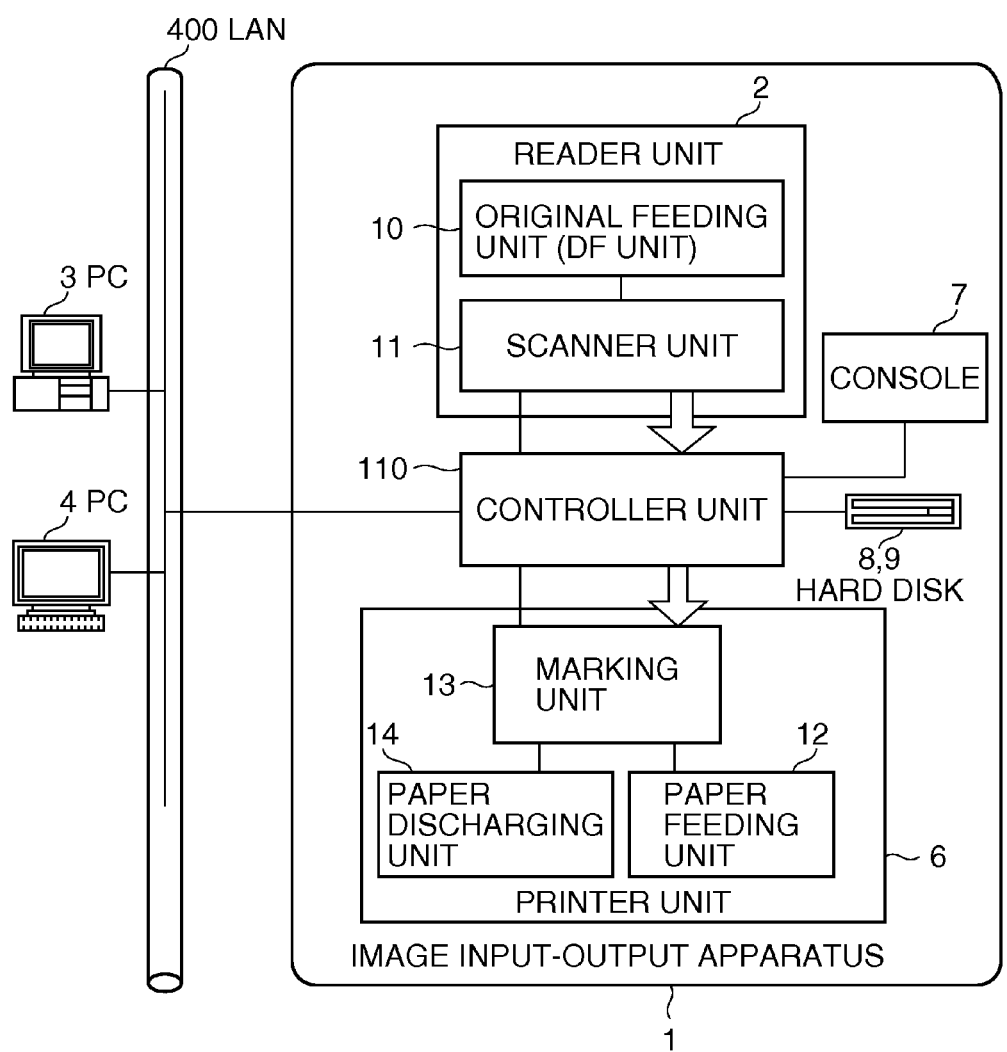
FIG. 1 is a block diagram schematically showing an arrangement of an image input-output apparatus as an information processing apparatus to which a memory swap management method according to an embodiment of the present invention is applied.

FIG. 1 is a block diagram schematically showing an arrangement of an image input-output apparatus as an information processing apparatus to which a memory swap management method according to an embodiment of the present invention is applied.

The image input-output apparatus 1 is connected to host computers (PC) 3 and 4 via a LAN (local area network) 400 such as Ethernet (registered trademark). The image input-output apparatus 1 has a reader unit 2 that carries out processing to read image data, a printer unit 6 that carries out processing to output image data, and a controller unit 110. Further, the image input-output apparatus 1 has a console 7 having a liquid crystal panel that displays image data, various functions, and so on, and hard disk drives (HDD) 8 and 9 in which control programs, image data, and so on are written in advance. The above component elements are connected to and controlled by the controller unit 110.

The reader unit 2 has an original feeding unit 10 that conveys originals, and a scanner unit 11 that optically reads an image on an original and converts the same into image data as an electric signal. The printer unit 6 has a sheet feeding unit 12 that has a plurality of paper cassettes accommodating recording sheets, and a marking unit 13 that transfers and fixes image data on recording sheets. The printer unit 6 also has a sheet discharging unit 14 that carries out sort processing and staple processing on printed recording sheets and externally discharges the same.

Figure 2:
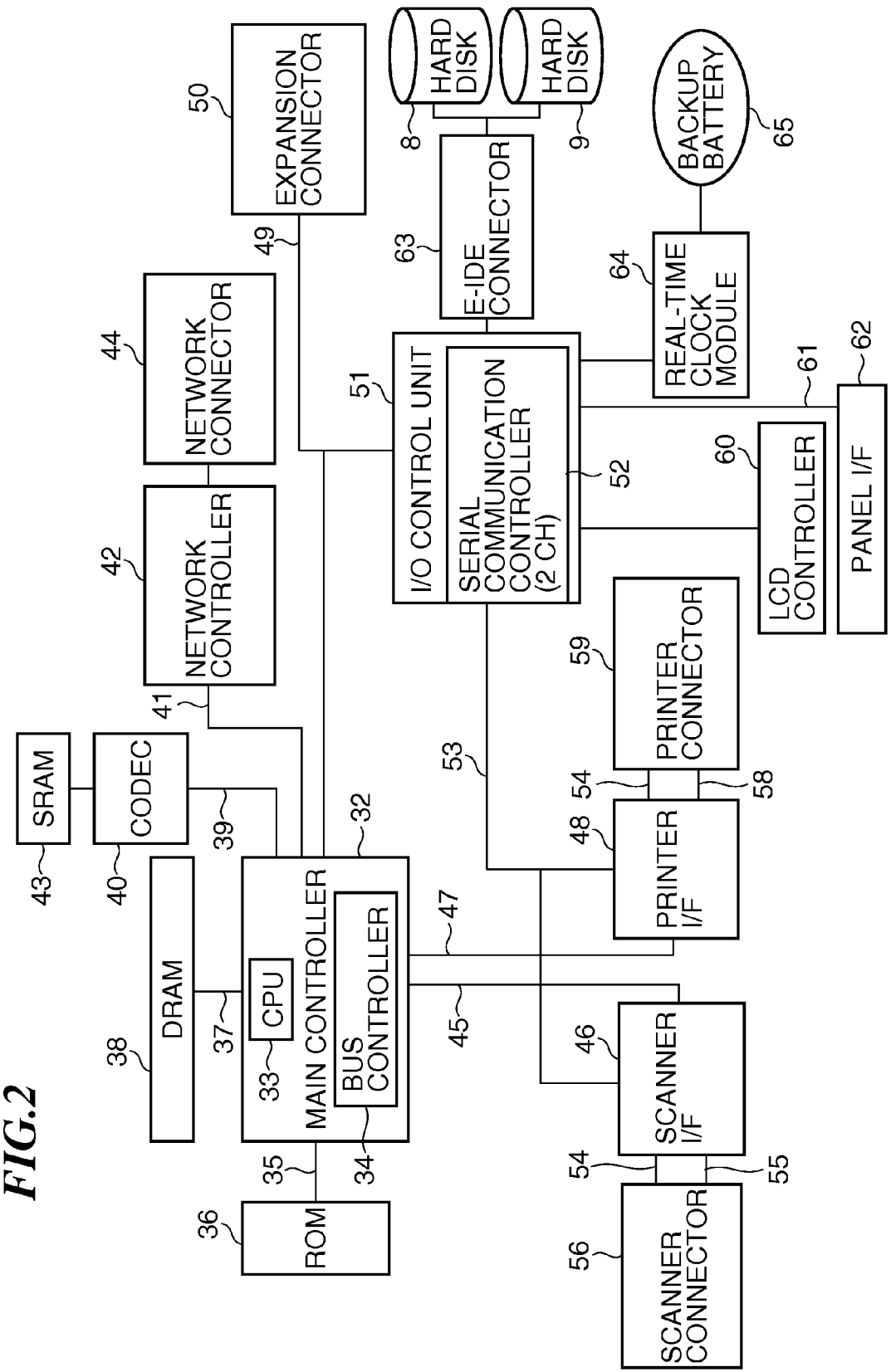
FIG. 2 is a block diagram schematically showing in detail an arrangement of a controller unit.

FIG. 2 is a block diagram schematically showing in detail an arrangement of the controller unit 110.

The controller unit 110 has a main controller 32. The main controller 32 has a CPU 33, a bus controller 34, and functional blocks including various control circuits, described later, incorporated therein.

The controller unit 110 has a ROM 36 connected thereto via a ROM I/F (interface) 35, and also has a DRAM 38 connected thereto via a DRAM I/F 37. Further, the controller unit 110 has a codec 40 connected thereto via a codec I/F 39, and also has a network controller 42 connected thereto via a network I/F 41.

The ROM 36 stores various control programs and computation data executed by the CPU 33 of the main controller 32. The DRAM 38 is used as a work area for operation of the CPU 33, and an area for saving image data. The DRAM 38 also stores various tables, described later. The codec 40 compresses raster image data accumulated in the DRAM 38 using a well-known compression method such as MH, MR, MMR, or JBIG, and decompresses the compressed data into raster images.

The codec 40 has an SRAM 43 connected thereto, and the SRAM 43 is used as a temporary work area for the codec 40. The network controller 42 carries out predetermined control processing between the controller unit 110 and a LAN 400 via a network connector 44. The main controller 32 is connected to a scanner I/F 46 via a scanner bus 45, and connected to a printer I/F 48 via a printer bus 47.

The main controller 32 is further connected to an expansion connector 50 for connecting with an expansion board, and an input-output control unit (I/O control unit) 51 via a universal high-speed bus 49 such as a PCI bus. The input-output control unit (I/O control unit) 51 is equipped with a two-channel asynchronous serial communication controller 52 for sending and receiving control commands to and from the reader unit 2 and the printer unit 6. The scanner I/F 46 and the printer I/F 48 are connected to the serial communication controller 52 via an I/O bus 53.

The scanner I/F 46 is connected to a scanner connector 56 via a first asynchronous serial I/F 54 and a first video I/F 55, and the scanner connector 56 is connected to the scanner unit 11 of the reader unit 2 (FIG. 1). The scanner I/F 46 carries out desired binary-coding processing and zooming processing in the main scanning direction and/or the sub-scanning direction on image data received from the scanner unit 11. Also, the scanner I/F 46 generates a control signal based on a video signal sent from the scanner unit 11, and transfers the same to the main controller 32 via the scanner bus 45.

The printer I/F 48 is connected to a printer connector 59 via a second asynchronous serial I/F 57 and a second video I/F 58, and the printer connector 59 is connected to the marking unit 13 of the printer unit 6 (FIG. 1).

The printer I/F 48 carries out smoothing processing on image data outputted from the main controller 32, and outputs the image data to the marking unit 13. Further, the printer I/F 48 generates a control signal based on a video signal sent from the marking unit 13, and outputs the same to the printer bus 47.

The CPU 33 of the main controller 32 operates in accordance with a control program loaded from the ROM 36 via the ROM I/F 35. For example, the CPU 33 interprets PDL (page description language) data received from the host computers 3 and 4 (FIG. 1), and expands the same into raster image data.

Also, the bus controller 34 controls transfer of data inputted from and outputted to external devices connected to the scanner I/F 46, the printer I/F 48, and the expansion connector 50, and so on, and controls arbitration at a time of bus contention and transfer of DMA data. For example, transfer of data between the above described DRAM 38 and the codec 40, transfer of data from the scanner unit 11 to the DRAM 38, transfer of data from the DRAM 38 to the marking unit 13, and so on are controlled by the bus controller 34 so that they can be DMA transferred.

A panel I/F 62 is connected to the I/O control unit 51 via an LCD controller 60 and a key input I/F 61, and the console 7 (FIG. 1) is connected to the panel I/F 62. The I/O control unit 51 is connected to an EEPROM, not shown, as a nonvolatile memory area. The I/O control unit 51 is also connected to the hard disk drives (HDD) 8 and 9 via an E-IDE connector 63. The I/O control unit 51 is further connected to a real-time clock module 64 that updates/stores the date and time managed within the apparatus. The real-time clock module 64 is connected to a backup battery 65 and backed up by the backup battery 65.

In the present embodiment, the controller unit 110 acts as a memory swap management apparatus. The CPU 33 acts as a determination unit, a swap processing unit, and a predicting unit. The DRAM 38 acts as a recording unit and a storage unit. The hard disk drives (HDD) 8 and 9 act as a recording unit.

Figure 3:
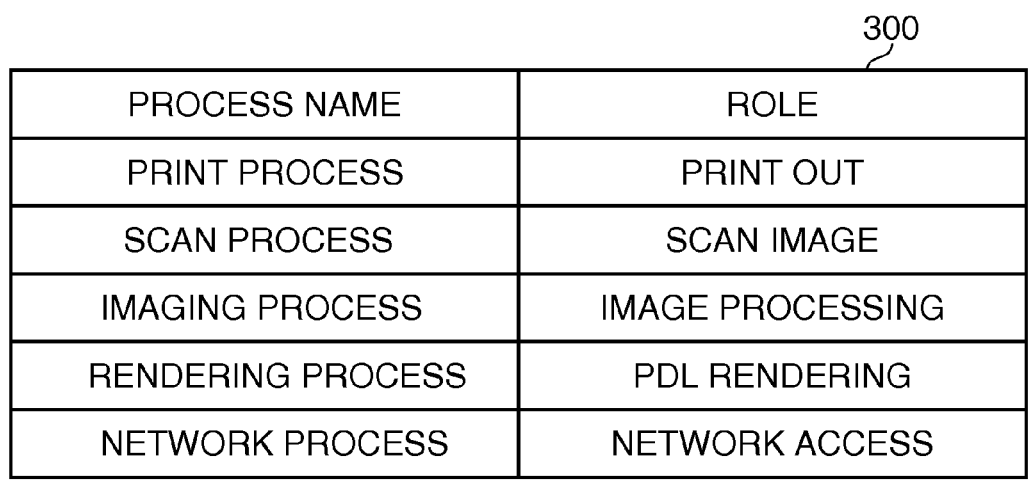
FIG. 3 is a view showing a table that represents process names and roles of processes that are executed by the image input-output apparatus.

FIG. 3 is a view showing a table of process names and roles of processes that are executed by the image input-output apparatus 1. One of processes shown in this table 300 is a "network process". This is not a system-resident process such as a driver for a network card or a TCP/IP protocol stack, but an application program for sending and receiving facsimiles.

In the following description, the word "process" is omitted sometimes in the description of each process.

FIG. 4 is a view showing a job process table. In this job process table 401, jobs that are executed by the image input-output apparatus 1, process names of processes constituting jobs, and execution sequences of processes executed in jobs are written.

Here, jobs are units that execute functions such as scanning and printing offered by the image input-output apparatus 1, and each job is executed by processes corresponding thereto (constituting the job) being executed in a predetermined execution sequence. For example, in a copy job, scan, and print, and imaging processes are executed in this sequence.

FIG. 5 is a view showing an exemplary job queue. In the job queue 500, jobs waiting to be executed by the image input-output apparatus 1 and names and planned execution sequences of processes constituting the jobs are written. The job queue 500 is created on the DRAM 38 by the CPU 33 when the system is started (for example, at power-on of the image input-output apparatus 1) (a storage step). Then, in response to reception of a PDL job from the host computer 3 or 4, or an instruction for copying, faxing, or the like from the user via the console 7, a new job is added to the job queue 500. The job queue 500 is updated by addition of a new job and completion of execution of a job.

The column of an item "sequence" in the job queue 500 indicates the sequence of the corresponding jobs waiting to be executed in a queue, and the jobs are executed in order of numeric value from smallest to largest. The column of an item "job queue" in the job queue 500 indicates job names of jobs executed in a sequence indicated by the item "sequence". The column of an item "execution sequence of corresponding processes" in the job queue 500 indicates the execution sequences of processes constituting the corresponding jobs.

In the case of the job queue 500 shown in FIG. 5, first, a "pdl print job" of which item "sequence" is "1" is executed, and print, imaging, and rendering processes constituting the job are executed in this sequence. The executed job is deleted from the job queue 500, and contents of the row of which item "sequence" item is "2" shift to the row of which item "sequence" item is "1", and similarly, contents of each row are moved up to smaller number sides. Then, jobs of the rows of which item "sequence" is "1" are executed until the job queue 500 becomes empty.

FIG. 6 shows an exemplary process execution history table in an initial state. The process execution history table 600 is a table showing the relationship between a most recently executed process and a process executed next. Namely, the process execution history table 600 is information indicative of a process execution history.

In the process execution history table 600, the left column indicates process names of "most recently executed processes", and the right column indicates execution frequencies (the number of executions) of processes executed next after (i.e. immediately after) the most recently executed processes as frequency values for respective processes. For example, referring to the first row of the process execution history table 600 in FIG. 6, immediately after a print process, an imaging process is executed ten times, a rendering process is never executed, and a scan process is executed once. Such execution frequencies are information for predicting, with respect to each process, which process will be executed with what degree of possibility next after a most recently executed process.

Initial values of the process execution history table 600 are stored in the ROM 36 of the controller unit 110. The process execution history table 600 at its default is configured assuming that "copy" and "pdl print" jobs are frequently executed in the default settings of the system. At the first startup of the system, the CPU 33 reads the process execution history table 600 stored in the ROM 36 via the ROM I/F 35, and loads the same into the DRAM 38 via the DRAM I/F 37. Also, at exit of the system, the CPU 33 acquires the process execution history table 600 on the DRAM 38 via the DRAM I/F 37. Then, the CPU 33 stores its values in the hard disk drive 8 or 9 via the E-IDE connector 63 (a recording step).

At the second and subsequent system startup, the CPU 33 reads the process execution history table 600 stored in the hard disk drive 8 or 9 to use previously updated results. It should be noted that in the above description, the process execution history table 600 is stored in the hard disk drive 8 or 9, but insofar as the controller unit 110 is equipped with another storage device (such as a flash memory), this may be used.

Figure 7:
FIG. 7 a view showing an exemplary updated process execution history table.

The process execution history table 600 is updated with execution of jobs. For example, an environment in which a job sequence of copy→fax transmission-scan-fax transmission is executed with high frequency is assumed. FIG. 7 shows an exemplary process execution history table 600 that is updated as the same job sequence as the assumed one is repeatedly executed.

Referring to the first row of the updated process execution history table 600 shown in FIG. 7, the frequency value of an imaging process immediately after a print process increases to 17 due to repetition of the above job sequence. This is because a print process is included only in a copy job, and moreover, in a copy job, an imaging process is executed immediately after a print process insofar as the above job sequence is concerned.

The process execution history table 600 is updated as described hereafter. When a certain process is executed this time, the CPU 33 identifies the row of a most recently executed process in the process execution history table 600 stored in the DRAM 38. Then, the CPU 33 increments the frequency value of the process executed this time by "1". For example, assuming that an imaging process is executed this time, and a print process is executed immediately before the imaging process, the value of the imaging process in the row of the print process is incremented by "1".

In addition to the above operation, when the original frequency value increased is not the maximum value in the row to which the item for which the frequency value has been increased belongs, the CPU 33 decrements the frequency value of a process whose value is the maximum by "1". This reflects on the process execution history table 600 that the prediction is wrong. In the process execution history table 600 shown in FIG. 7, it is assumed that a scan process is executed this time, and a print process is executed immediately before the scan process. In this case, the frequency value of the scan process in the row of the print process is incremented by "1", and the frequency value of the imaging process whose frequency value is the maximum (17) is decremented by "1".

To swap in a process expected to be executed next with high possibility based on the process execution history table 600, memory areas subjected to swap processing and processes are managed in association with each other.

In the present embodiment, in virtual storage of processes, the DRAM 38 acts as a primary storage device, and provides "real memory" in which processes are swapped in and stored. On the other hand, the hard disk drives 8 and 9 act as a secondary storage device, and provide memory areas to which processes are swapped out. However, this is only illustrative, and other types of storage devices may be used as long as a storage device with higher access rate is used as a primary storage device.

FIG. 8A is a diagram showing an exemplary process memory management table. The process memory management table 800 is information indicative of the relationship between virtual addresses, real addresses, and so on associated with processes. FIG. 8B is a diagram showing a case where the process memory management table in FIG. 8A is updated, the details thereof being described later.

In the present embodiment, it is assumed that a one-page memory area is allocated to each process so as to facilitate understanding. Also, it is assumed that real memory is a two-page memory area, and a swap file is a three-page memory area. However, these setting values are only illustrative, and they are not limited.

When a process is executed, the CPU 33 allocates a virtual address of the corresponding memory area, and writes the address in the column of "virtual address" in the process memory management table 800. Next, real memory is allocated. If there is a free space in the real memory, the CPU 33 writes "present" in the column of "corresponding real address", and writes a value of a real address in the column of "information". If there is no free space in the real memory, the CPU 33 swaps out contents of a memory area with low necessity to the HDD 8 or the HDD 9 in accordance with an LRU (Least Recent Used) algorithm or the like, resulting in allocation to an address in the real memory freed as a result.

The CPU 33 writes "absent" in the column of corresponding memory address, and writes "segment ID#" in a swap file in the column of "information".

The column of "priority" in the process memory management table 800 indicates the priority of pages belonging to the same process, and smaller values indicates higher priorities. The CPU 33 swaps in pages in order of priority according to a space size of the real memory. For example, by giving high priority to a page required at the start of execution of a process, the probability that the page exists in the real memory can be made high. In the present embodiment, it is assumed that one process is equal to one page, and hence the priorities are all "1".

Referring next to flowcharts of FIGS. 9 to 11, a description will be given of how swap processing is carried out by predicting a process to be executed next with high possibility.

Figure 9:
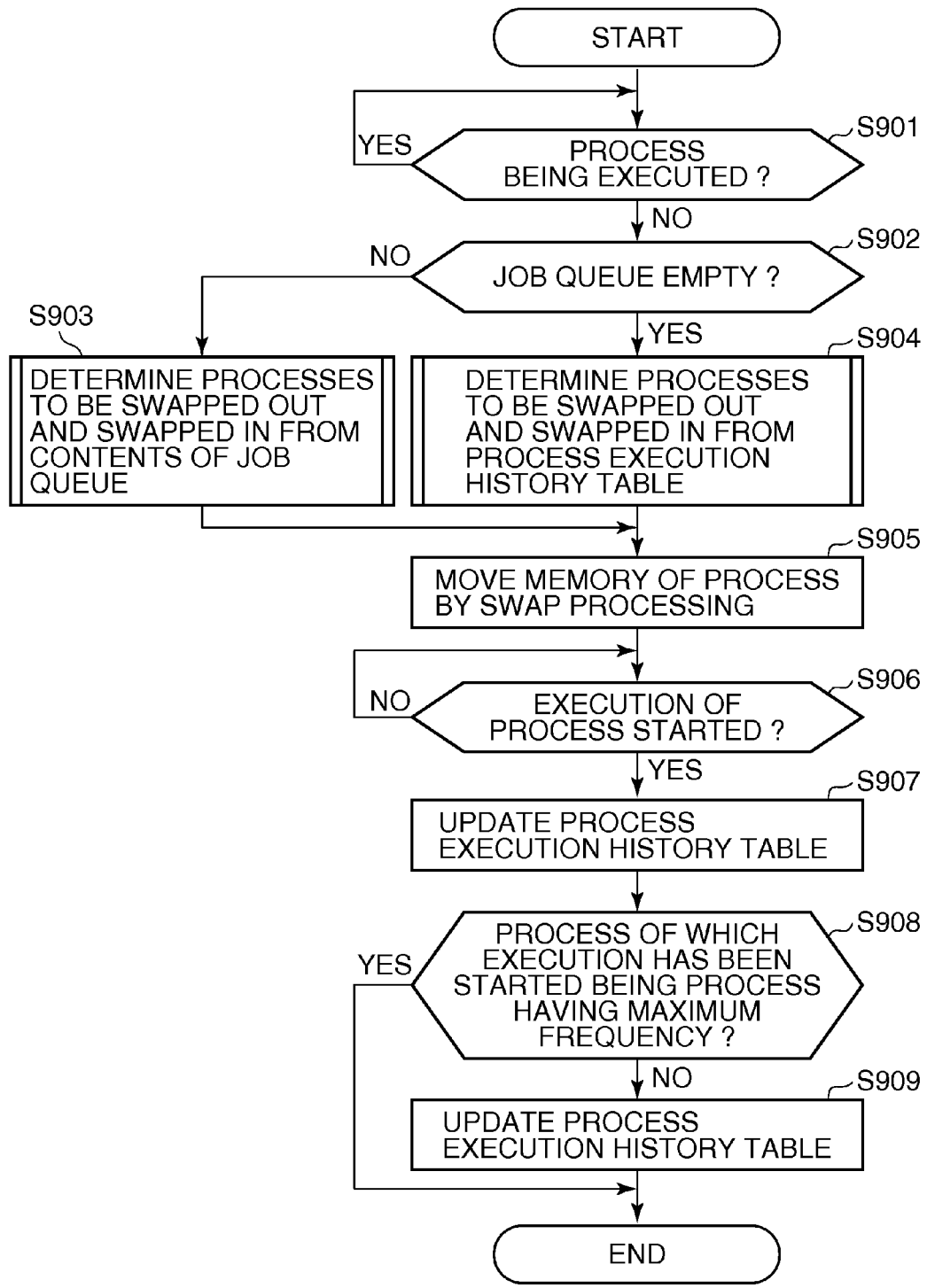
FIG. 9 is a flowchart showing the overall processing of swap control.

FIG. 9 is a flowchart showing the overall processing of swap control.

Upon starting the memory swap processing in FIG. 9, first, the CPU 33 determines in step S901 whether or not there is any process being currently executed. When there is any process being currently executed, the CPU 33 waits for completion of the process. When there is no process being currently executed, the CPU 33 proceeds to step S902. Thus, while the system is idling, processing in the step S902 and subsequent steps is executed.

In the step S902, the CPU 33 determines whether or not there is any job waiting to be executed in the job queue 500 (FIG. 5) in the DRAM 38. When there is any job waiting to be executed, the CPU 33 proceeds to step S903. On the other hand, when there is no job waiting to be executed (when the job queue is empty), the CPU 33 proceeds to step S904.

In the step S903, the CPU 33 determines a process to be swapped in and a process to be swapped out from the contents of the job queue 500 (a determination step). A process determination method used here (referred to as the first determination method) will be described later with reference to FIGS. 5, 10, 12, and 14A to 14C.

In the step S904, the CPU 33 determines a process to be swapped in and a process to be swapped out from contents of the process execution history table 600 (the determination step). A process determination method used here (referred to as the second determination method) will be described later with reference to FIGS. 6, 7, 11, and 13A to 13D.

When the processes subjected to swapping are determined in the step S903 or the step S904, the CPU 33 proceeds to step S905. In the step S905, the CPU 33 executes swap processing (a swap processing step). The swap processing is executed using a swap target process table 1301 (see FIGS. 13B, 13D, and 14A) and the process memory management table 800 (see FIGS. 8A and 14B) in the DRAM 38.

FIG. 13A is a process execution frequency table created based on the process execution history table 600 shown in FIG. 6 when a most recently executed process is scan. Based on this process execution frequency table 1300, a swap target process table 1301 shown in FIG. 13B is created by processing in FIG. 11, described later. FIGS. 13C and 13D show a case where contents of the process execution history table 600 upon which a process execution frequency table is based differ from those in FIGS. 13A and 13B when a most recently executed process is scan. Specifically, FIG. 13C shows, similarly to FIG. 13A, a process execution frequency table 1300 created based on the process execution history table 600 shown in FIG. 7 when a most recently executed process is scan. Based on this process execution frequency table 1300, a swap target process table 1301 shown in FIG. 13D is created.

Referring again to FIG. 9, the following processing is carried out in the swap processing in the step S905. First, a process determined as a swap-out candidate in the swap target process table 1301 (an explanation is given by taking FIG. 13B as an example) is imaging. The CPU 33 checks whether or not the process is present (stored) in the real memory. Specifically, the CPU 33 determines whether or not the "corresponding real address" in imaging is "present" in the process memory management table 800 (an explanation is given by taking FIG. 8A as an example).

Then, when imaging is not present in real memory, the CPU 33 does not do anything. In the example shown in FIG. 8A, because imaging is present in real memory, swap-out of imaging is carried out, and the process memory management table 800 is updated.

Specifically, the CPU 33 swaps out imaging from the real memory to the HDD 8 or 9. Concurrently with this, "absent" is written in the item "corresponding real address" in the row of imaging in the process memory management table 800. Further, a segment ID#4 on the HDD 8 or 9 as the swap-out destination is written in the item "information".

When swap-out of imaging has been carried out, the CPU 33 then checks whether or not print as a process determined as a swap-in candidate in the swap target process table 1301 (FIG. 13B) is present in the real memory. This is checked by referring to the process memory management table 800 (FIG. 8A).

Then, when print is already present in the real memory, the CPU 33 does not do anything. In the example shown in FIG. 8A, because print is not present in the real memory, the CPU 33 swaps in print from the HDD 8 or 9 to an area of the real memory freed by swap-out of imaging, updates the process memory management table 800, and proceeds to step S906.

Specifically, "present" is written in the item "corresponding real address" in the row of print in the process memory management table 800 (FIG. 8A). Concurrently with this, the CPU 33 writes "0x1000" as a real address at which there was imaging process is written in the item "information".

In the above described way, the process memory management table 800 is updated to contents as shown in FIG. 8B.

In subsequent steps S906 to S909, processing for updating the process execution history table 600 according to an executed process is carried out.

First, in the step S906, the CPU 33 checks whether or not execution of any process has been started, and proceeds to step S907 when execution of a process has been started. In the step S907, the CPU 33 updates the process execution history table 600 based on a type of the process of which execution has been actually started.

Usually, the latest process execution history table 600 is used, but insofar as the description given here is concerned, the process execution history table 600 shown in FIG. 6 in the initial state is used in the processing of the step S907. For example, assume that a most recently executed process is scan. Assuming that a job executed after the step S905 is a fax transmission job, the process for which it is determined whether or not execution thereof has been started is a scan process that is at the top of processes constituting the fax transmission job.

In this case, the CPU 33 updates the process execution history table 600 by adding "1" to a scan frequency value of "1" in the right column and obtaining "2" in the row of scan in the process execution history table 600 (FIG. 6), and proceeds to step S908.

In the step S908, the CPU 33 determines whether or not the process (scan) of which execution has been started is a process having the maximum frequency value in the row of the most recently executed process (scan) in the process execution history table 600 (FIG. 6).

In the example shown in FIG. 6, a process having the maximum frequency value in the row of the most recently executed process (scan) in the process execution history table 600 is print having a frequency value of 10, which is different from the process (scan) of which execution has been started. For this reason, the CPU 33 proceeds to step S909. When both processes correspond to each other, the CPU 33 terminates the present process without executing the step S909.

In the step S909, the CPU 33 updates the process execution history table 600 (FIG. 6) by subtracting "1" from a value 10 of the process (print) having the maximum frequency value in the right column of the process execution history table 600 and obtaining "9", and terminates the present processing.

The contents of processing in the above described steps S905 to S909 differ according to contents of the process execution history table 600 at the start of the processing and a process for which it is determined in the step S905 that execution thereof has been started. Assuming that the above-mentioned job sequence of copy→fax transmission→scan→fax transmission is repeated with high frequency, the process execution history table 600 finally becomes close to the contents shown in FIG. 7 as a result of updating.

The process execution history table 600 is information for predicting a process to be executed next from a most recently executed process. For example, a case where the above-mentioned job sequence is repeated with high frequency is considered. The following can be found from the job process table 401 (FIG. 4). Specifically, it can be found that after a scan process, print (in the case of a copy job), scan (in the case of a scan job→a fax transmission job), and network (in the case of a fax transmission job) processes are executed with high frequency.

For this reason, focusing on the row of a scan process, the frequency of print is high in the process execution history table 600 shown in FIG. 6, whereas the frequencies of scan and network are high in the process execution history table 600 shown in FIG. 7.

For this reason, it is predicted that in an environment in which in the process execution history table 600 is as shown in FIG. 7, a "fax transmission job" using scan and network processes is executed with high possibility after a scan job.

A detailed description will now be given of how targets to be swapped-in/out are determined in the steps S903 and S904.

Figure 10:
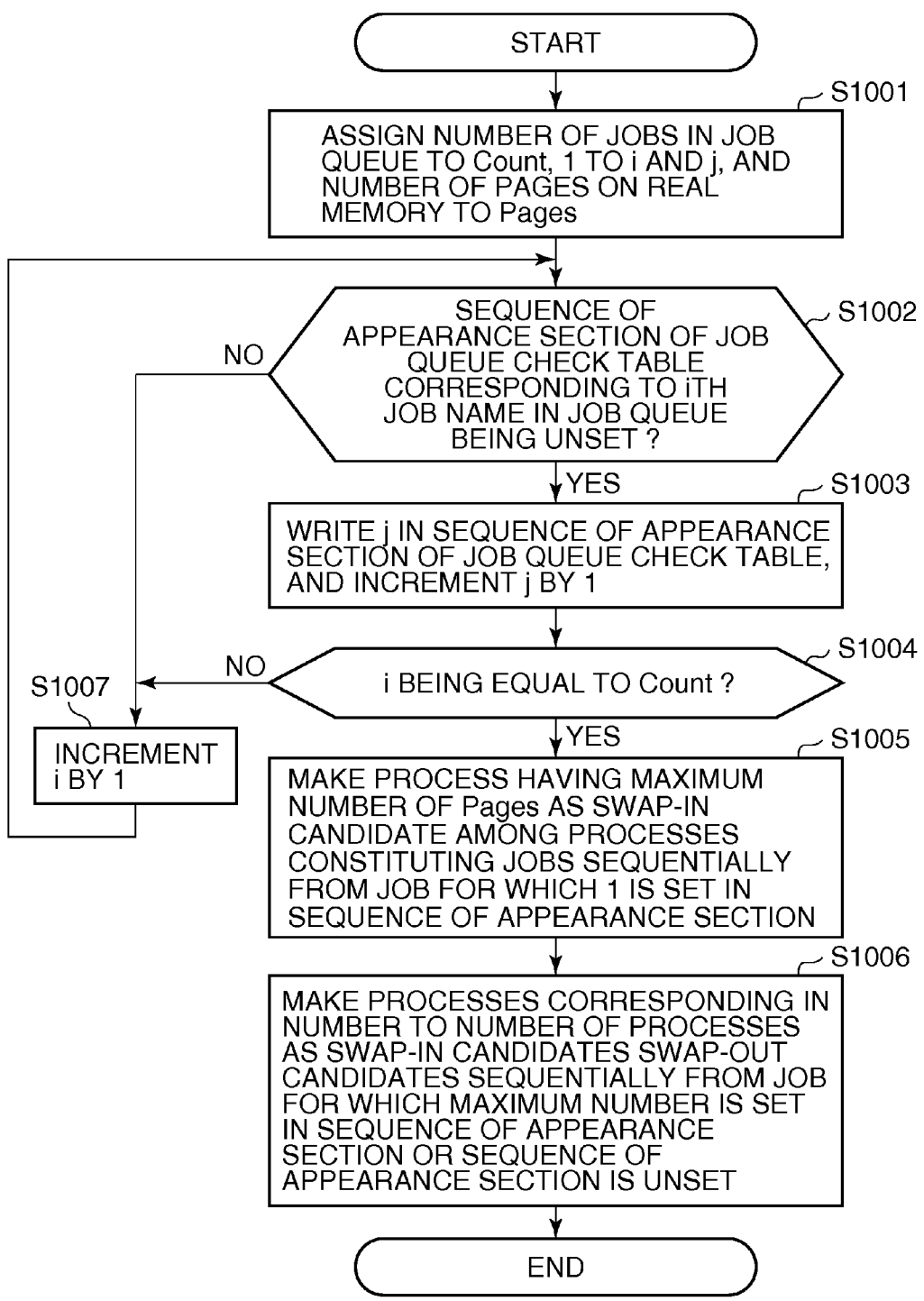
FIG. 10 is a flowchart showing processing (a first determination method) in which processes to be swapped are determined from contents of the job queue, which is executed in step S903 in FIG. 9.

FIG. 10 is a flowchart showing processing (the first determination method) executed in the step S903 in FIG. 9 in which processes to be swapped are determined from contents of the job queue 500 (FIG. 5).

Figure 12:
FIG. 12 is a view showing a job queue check table.

FIG. 12 is a view showing a job queue check table. The job queue check table 1200 is created from contents of the job queue 500 by the processing in FIG. 10. In the job queue check table 1200, the execution sequences of processes constituting jobs and the sequence of appearance of jobs are set with respect to job names.

In starting the processing in FIG. 10, the CPU 33 creates the job queue check table 1200 in the DRAM 38, and initializes the item "sequence of appearance" regarding all the jobs in the job queue check table 1200 to unset (blanks).

In step S1001, the CPU 33 assigns the number of jobs in the job queue 500 ("7" in the example shown in FIG. 5) to a variable Count used by a program that executes the processing, assigns "1" to variables i an j used by the program that executes the processing, and assigns the number of pages on the real memory ("2" in the example shown in the present embodiment) to a variable Pages used by the program that executes the processing. In the next step S1002, the CPU 33 determines whether or not the sequence of appearance section of a job name in the job queue check table 1200 which corresponds to the ith job name in the job queue 500 has not been set (blank). When the sequence of appearance section has not been set, the CPU 33 proceeds to step S1003, and when the sequence of appearance section has been set, the CPU 33 proceeds to step S1007. In the step S1007, the CPU 33 increments the variable i by "1", and proceeds to the step S1002.

For example, when i=1, the first job in FIG. 5 is pdl print. In this case, the sequence of appearance section in the row of pdl print in FIG. 12 is not unset because "1" is set, the CPU 33 proceeds to the step S1007. Thus, in the sequence of appearance section in which a value has already been set, the value is maintained as it is.

In the step S1003, the CPU 33 writes the value of the variable j in the sequence of appearance section of a job name in the job queue check table 1200 which corresponds to the ith job name in the job queue 500, increments the variable j by "1", and proceeds to step S1004. In the step S1004, the CPU 33 determines whether or not the variable i is equal to the variable Count. When, as a result of the determination, the variable i is equal to the variable Count, the CPU 33 proceeds to step S1005, and on the other hand, when the variable i is not equal to the variable Count, the CPU 33 proceeds to the step S1007.

Thus, in the processing of the steps S1001 to S1004, numbers are assigned to respective jobs in the order of "1", "2", . . . in the job queue check table 1200 (FIG. 12) according to the execution sequence defined in the job queue 500 (FIG. 5). On this occasion, "1" is assigned first to a job that is at the top in the "sequence of appearance" of jobs. However, at the second appearance, the sequence of appearance that has already been set is maintained. Regarding jobs that are not in the job queue 500, the sequence of appearance with respect to j is maintained unset.

In the step S1005, beginning from a job for which "1" is set in the sequence of appearance section in the job queue check table 1200, the CPU 33 determines processes constituting the job (pdl print in the example shown in FIG. 12) as targets to be swapped in. Specifically, the CPU 33 determines processes as swap-in candidates which correspond in number to the maximum number of pages (here, two) in order of priority defined by the execution sequence. In the same job, a process executed earlier is given a higher priority. When the maximum number of Pages cannot be reached with only a job for which "1" is set in the sequence of appearance section, processes of a job for which "2" is set in the sequence of appearance section are targeted next.

In the above described way, a swap target process table 1301 shown in FIG. 14A is created from the job queue check table 1200. Here, first, a print process and an imaging process constituting a pdl print job are set in the swap target process table 1301 as swap-in candidates.

Here, it should be noted that when the swap-in candidates are the same as processes that are already present in the real memory, processes that are given the next highest priorities, that is, processes executed next earliest may be determined as swap-in candidates in place of those candidates. Assuming that a fax transmission job was most recently executed, this means that a scan process and a network process were present in the real memory. In this case, because the contents of real memory and processes of pdl print are entirely different, pdl and imaging are determined as swap-in candidates.

Next, in step S1006, first, when there is any job for which the sequence of appearance section in the job queue check table 1200 is unset, the CPU 33 determines processes constituting the job as swap-out candidates. Namely, the CPU 33 determines swap-out candidates corresponding in number to the number of the swap-in candidates determined as described above.

At this time, the CPU 33 gives a higher priority to a process executed later among the processes constituting the job. However, when there is no job for which the sequence of appearance section is unset, and when the same number as the number of swap-in candidates cannot be reached with only a job for which the sequence of appearance section is unset, the CPU 33 determines processes constituting a job for which the largest number is set in the sequence of appearance section as the swap-out candidates.

Specifically, the CPU 33 carries out the same processing on rows of jobs sequentially in sequence of appearance in the job queue check table 1200. Then, the CPU 33 repeats the processing until processes which correspond in number to the number of process determined as swap-in candidates in the step S1005 become swap-out candidates.

Here, when there are two or more jobs for which the sequence of appearance section is unset, or when there are two or more jobs for which the largest number is set in the sequence of appearance section, it is preferred that which job is given priority in the selection of candidates is set by default.

It should be noted that swap-out candidates determined once include swap-in candidates determined in the step S1005, those swap-out candidates may be excluded from targets. For example, when the job queue check table 1200 is as shown in FIG. 12, network is determined as a candidate first with print as a swap-in candidate excluded among network and print processes constituting a fax reception job for which the sequence of appearance section is unset.

Further, when a process determined as a swap-in candidate is excluded from swap-out candidates, a process given the second priority may be added as a swap-out candidate. For example, when the job queue check table 1200 is as shown in FIG. 12, a scan process of a scan job for which "4" is set in the sequence of appearance section is added as a swap-out candidate. As a result, network and scan are determined as swap-out candidates.

In the above described way, the network and scan processes are determined as the swap-in/out candidates in the swap-out target process table 1301 shown in FIG. 14A.

FIG. 14B shows an exemplary process memory management table in a state in which a fax transmission job was most recently executed. FIG. 14C shows a process memory management table obtained by updating the process memory management table in FIG. 14B based on the swap-out target process table 1301 shown in FIG. 14A. Specifically, network and scan as swap-out candidates are swapped out in the step S905 in FIG. 9. Then, print and imaging as the swap-in candidates are swapped into an area of the real memory freed as a result of the swap-out.

A case where a job planned to be executed next is pdl print in a state in which a fax transmission job was most recently executed is considered (see FIGS. 5 and 12). Print and imaging which are processes constituting the pdl print job are already present in the real memory due to the swap processing in the step S905 in FIG. 9. Thus, new swap processing does not occur at start of execution of the pdl print job, but execution of the next process (print) can be immediately started.

Figure 11:
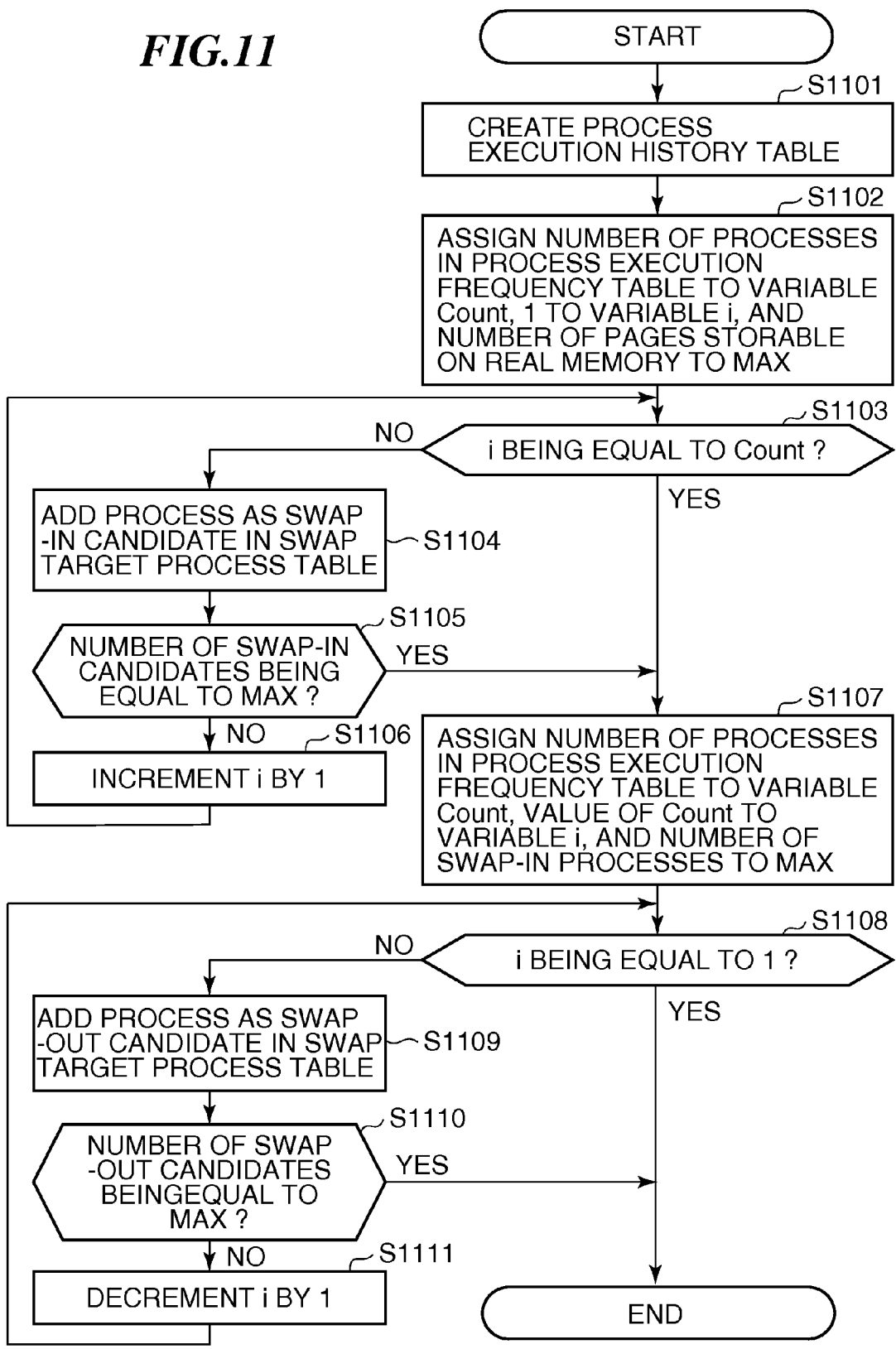
FIG. 11 is a flowchart showing processing (a second determination method) for determining processes subjected to swap processing from the process execution history table, which is executed in step S904 in FIG. 9.

FIG. 11 is a flowchart showing processing (second determination method) for determining processes subjected to swap processing from the process execution history table 600, which is executed in the step S904 in FIG. 9.

First, in step S1101, the CPU 33 creates a process execution frequency table 1300 (13A) from the process execution history table 600 in the DRAM 38 (a predicting step). Specifically, the CPU 33 rearranges "processes executed next" from the left in order of execution frequency from highest to lowest in the row of a most recently executed process in the process execution history table 600 (FIG. 6).

For example, when a most recently executed process is scan, if attention is focused on the row of scan, the order of execution frequency is print, network, and scan in the process execution history table 600 shown in FIG. 6. The rearrangement order in rearrangement of processes whose execution frequencies are the same is set by default. For example, the execution frequency of rendering is "0", which is the same as that of imaging, but for example, rendering is given higher priority in rearrangement by default.

What is created in the above described way is the above-mentioned process execution frequency table 1300 shown in FIG. 13A. In this connection, what is created based on the process execution history table 600 shown in FIG. 7 is the above-mentioned process execution frequency table 1300 shown in FIG. 13C. After that, the CPU 33 proceeds to step S1102.

In the following description of the present process, it is assumed that a scan process was most recently executed, and the process execution frequency table 1300 is created based on the process execution history table 600 shown in FIG. 6.

In step S1102, the CPU 33 assigns the number of processes set in the process execution frequency table 1300 ("5" in the present embodiment) to a variable Count. Further, the CPU 33 assigns "1" to a variable i, and assigns the number of pages ("2" in the present embodiment) that can be stored in the real memory to MAX as a setting value. In step S1103, the CPU 33 determines whether or not the variable i is equal to the variable Count. When, as a result of the determination, the variables are equal, the CPU 33 proceeds to step S1107, and on the other hand, when the variables are not equal, the CPU 33 proceeds to step S1104.

In the step S1104, the CPU 33 adds a process on the ith column of the process execution frequency table 1300 (FIG. 13A) as a swap-in candidate in the swap target process table 1301 (see FIG. 13B), and proceeds to step S1105. For example, when i=1, the CPU 33 adds print on the first column from the left in FIG. 13A as a swap-in candidate.

Incidentally, when a process is to be added as a swap-in candidate in the step S1104, the CPU 33 compares a value of "frequency" (frequency value) of the process to be added with a frequency value of a process whose frequency value is the next largest. When a difference in the frequency value between them exceeds a prescribed value ("5" in the present embodiment, but not limited to this), the CPU 33 does not add any swap-in candidate after the process to be added. This aims at preventing unnecessary swap processing from being carried out due to swap-in of a process that is unlikely to be executed next.

When the process execution frequency table 1300 is as shown in FIG. 13A, a difference in the frequency value between print as a process to be added and network as a process whose frequency value is the next largest is "8", which exceeds the prescribed value. Thus, processes after network are not targeted, and only print is added as a swap-in candidate in the swap target process table 1301. In this case, the process proceeds from the step S1104 to the step S1107.

In the step S1105, the CPU 33 determines whether or not the number of swap-in candidates set in the swap target process table 1301 is equal to MAX (=2). When, as a result of the determination, the number of swap-in candidates is equal to MAX, the CPU 33 proceeds to the step S1107, and on the other hand, when the number of swap-in candidates is not equal to MAX, the CPU 33 increments the variable i by "1" in step S1106, and proceeds to the above-mentioned step S1103. Thus, insofar as the difference in the frequency value does not exceed the prescribed value, swap-in candidates are added until the number of swap-in candidates becomes equal to MAX.

In the step S1107, the CPU 33 assigns the number of processes ("5" in this example) in the process execution frequency table 1300 to the variable Count. Further, the CPU 33 assigns the value of the variable Count ("5" in this example) to the variable i, assigns the number of processes as swap-in candidates in the swap target process table 1301 ("5" in this example) to MAX, and proceeds to step S1108.

In the step S1108, the CPU 33 determines whether or not the variable i is equal to "1". When, as a result of the determination, the variable i is equal to "1", the CPU 33 terminates the process, and on the other hand, when the variable i is not equal to "1", the CPU 33 proceeds to step S1109.

In the step S1109, the CPU 33 adds a process in the ith column in the process execution frequency table 1300 (when i=5, imaging at the top from the right) as a swap-out candidate in the swap target process table 1301 (FIG. 13B), and proceeds to step S1110.

In the step S1110, the CPU 33 determines whether or not the number of swap-in candidates set in the swap target process table 1301 is equal to MAX. When, as a result of the determination, the number of swap-in candidates is equal to MAX, the CPU 33 terminates the process, and on the other hand, when the number of swap-in candidates is not equal to MAX, the CPU 33 decrements the variable i by "1" in step S1111, and proceeds to the above-mentioned step S1108.

In the example shown in FIG. 13B, the number of processes as swap-in candidates is only one, that is, print, the number of swap-out candidates is only one, that is, imaging. The processes set in the swap target process table 1301 at the end of the processing in FIG. 11 are swap-in/out candidates.

In this connection, assuming a case where the process execution frequency table 1300 is created based on the process execution history table 600 shown in FIG. 7, processing in the steps S1103 to S1106 and S1107 to S1111 is as follows.

In the steps S1103 to S1106, referring to the process execution frequency table 1300 shown in FIG. 13C, when a scan process is to be added, a difference in the frequency value between the scan process and a network process having the next largest frequency value is "0". Thus, the difference in frequency value does not exceed the prescribed value. In this case, the network process as well as the scan process is added as a swap-in candidate as shown in FIG. 13D.

Also, in the steps S1107 to S1111, because there are two swap-in candidates, imaging and rendering first and second from the right in the process execution frequency table 1300 are added as swap-out candidates (FIG. 13D).

Assume a state in which scan and imaging processes are present in the real memory, and a scan job was most recently executed. In this state, the process execution history table 600 (FIGS. 6 and 7) is updated, and a process to be executed next is predicted, and then swap processing is carried out. This obtains the following effects.

First, assume a case where swap processing (the steps S904 and S905 in FIG. 9, and FIG. 11) is carried out based on the process execution history table 600 (FIG. 6). In this case, scan and print processes are placed in the real memory (FIGS. 13A, 13B, and 8B). Assuming that a fax transmission job is executed next in this state, the scan and network processes are executed.

However, because memory of the network process does not exist in real memory, swap processing for swapping in the network process actually occurs. Thus, it takes time to start executing the process. This is because in the process execution history table 600 shown in FIG. 6, an execution history of processes resulting from continuous usage has not yet been reflected on a prediction of a process to be executed next.

On the other hand, assume a case where swap processing (the steps S904 and S905 in FIG. 9, and FIG. 11) is carried out based on the process execution history table 600 (FIG. 7). In this case, scan and network processes are placed in the real memory (FIGS. 13C and 13D). Assuming that a fax transmission job is executed next in this state, the scan and network processes are executed. However, because these processes are already present in the real memory, new swap processing does not occur, and hence execution of the next process can be immediately started.

According to the present embodiment, when there is a job queue waiting to be executed, processes as swap-out/in candidates are determined based on a planned execution sequence of jobs waiting to be executed, which are stored in the job queue 500 (FIG. 5) and types of processes stored in the real memory. This is mainly indicated in the steps S1005 and S1006 in FIG. 10, and FIGS. 12 and 14A (a first determination method).

As a result, a process that constitutes a job to be executed next and has a high possibility of being executed next can be preferentially placed in the real memory of the DRAM 38 as the primary storage device.

On the other hand, when there is no job queue waiting to be executed, a possibility of being executed next is predicted with respect to each process based on the process execution history table 600 (FIG. 7) as an execution history of processes and types of processes executed most recently (FIGS. 13A and 13C). Then, processes as swap-out/in candidates are determined based on the predicted possibilities (a second determination method) (FIGS. 11, 13B, and 13D).

As a result, a process that has a high possibility of being executed next can be preferentially placed in the real memory of the DRAM 38.

When either of the first and second determination methods is adopted, the processes as swap-out candidates are swapped out from the real memory to the hard disk drive 8 or 9. Further, the processes as swap-in candidates are swapped in from the hard disk drive 8 or 9 into an area of the real memory freed as a result of the swap-out (the step S905 in FIG. 9).

As a result, according to the present embodiment, the time to start executing the next process can be shortened. Namely, occurrence of swap processing immediately before execution of a job can be prevented, so that the processing speed of the device can be increased. In particular, because swap processing is carried out during idling, swapping is unlikely to occur immediately before execution of the next job.

Although it is assumed above that an information processing apparatus is the image input-output apparatus 1, this is only an example. Specifically, the present invention may be applied to any information processing apparatuses insofar as the memory swap management method in which a job comprised of processes is executed according to an instruction, and virtual storage of processes is carried out using a primary storage device and a secondary storage device is applied to the information processing apparatuses. Thus, any distinction is not made according to functions which the information processing apparatuses have.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-059420 filed Mar. 12, 2009, which is hereby incorporated by reference herein in its entirety.

What is claimed is:

1. An image processing apparatus comprising:
a primary storage device storing processes, of plural types, that are to be executed sequentially;
a secondary storage device; and
a processor configured to execute:
a processing task that sequentially executes the processes stored in the primary storage device;
a recording task that records history information regarding at least two processes, each having a type that belongs to one of the plural types of processes, successively executed by the processor;
a determination task that determines one or more types of the plural types of processes, that should be swapped-in from the secondary storage device to the primary storage device based on both the type, of the plural types of processes, of a process executed by the processor most recently and the history information recorded by the recording task; and
a swapping task that swaps-in, from the secondary storage device to the primary storage device, one or more processes of the one or more types of the plural types of processes that should be swapped-in as determined by the determination task,
wherein the at least two successively executed processes have a leading process executed first and at least one following process executed next,
wherein the history information shows a relationship between the leading process and the at least one following process, and includes the number of executions of each of the at least one following process that has been executed after the type of the plural types of processes of the leading process has been executed, and
wherein the determination task refers to the history information and then determines one or more types of the at least one following process, whose number of executions is larger than that of other types of the plural types of processes, that should be swapped-in from the secondary storage device to the primary storage device.

2. The information processing apparatus according to claim 1, wherein:
the determination task further determines one or more types of the plural types of processes that should be swapped-out from the primary storage device based on both the type, of the plural types of process, of the process executed by the processor most recently and the history information recorded by the recording task, and
the swapping task swaps-out, from the primary storage device to the secondary storage device, one or more processes of the one or more types of the plural types of processes that should be swapped-out as determined by the determination task.

3. The information processing apparatus as claimed in claim 2, wherein the determination task refers to the history information and then determines one or more types of the at least one following process, whose number of executions is smaller than that of other types of the plural types of processes that should be swapped-out from the primary storage device to the secondary storage device.

4. The information processing apparatus as claimed in claim 1, wherein the recording task updates the history information in association with execution of a process by the processor.

5. The information processing apparatus as claimed in claim 1, wherein at least one of the plural types of processes relates to a function for inputting an image or the function for outputting an image.

6. A method of controlling an information processing apparatus having a primary storage device storing processes, of a plural types, that are to be executed sequentially, a secondary storage device, and a processor that sequentially executes the processes stored in the primary storage device, the method comprising:
a recording step of recording history information regarding at least two processes, each having a type that belongs to one of the plural types of processes, successively executed by the processor;
a determination step of determining one or more types of the plural types of processes that should be swapped-in from the secondary storage device to the primary storage device based on both the type, of the plural types of processes, of a process executed by the processor most recently and the history information recorded in the recording step; and
a swapping step of swapping-in, from the secondary storage device to the primary storage device, one or more processes of the one or more types of the plural types of processes that should be swapped-in as determined in the determination step,
wherein the at least two successively executed processes have a leading process executed first and at least one following process executed next,
wherein the history information shows a relationship between the leading process and the at least one following process, and includes the number of executions of each of the at least one following process that has been executed after the type of the plural types of processes of the leading process has been executed, and
wherein the determination step refers to the history information and then determines one or more types of the at least one following process, whose number of executions is larger than that of other types of the plural types of processes, that should be swapped-in from the secondary storage device to the primary storage device.

7. A non-transitory computer readable storage medium storing a program executable by a computer to execute a method of controlling an information processing apparatus having a primary storage device storing processes, of a plural types, that are to be executed sequentially, a secondary storage device, and a processor that sequentially executes the processes stored in the primary storage device, the method comprising:
a recording step of recording history information regarding at least two processes, each having a type that belongs to one of the plural types of processes, successively executed by the processor;
a determination step of determining one or more types of the plural types of processes that should be swapped-in from the secondary storage device to the primary storage device based on both the type, of the plural types of processes, of a process executed by the processor most recently and the history information recorded in the recording step; and
a swapping step of swapping-in, from the secondary storage device to the primary storage device, one or more processes of the one or more types of the plural types of processes that should be swapped-in as determined in the determination step, wherein the at least two successively executed processes have a leading process executed first and at least one following process executed next, wherein the history information shows a relationship between the leading process and the at least one following process, and includes the number of executions of each of the at least one following process that has been executed after the type of the plural types of processes of the leading process has been executed, and wherein the determination step refers to the history information and then determines one or more types of the at least one following process, whose number of executions is larger than that of other types of the plural types of processes, that should be swapped-in from the secondary storage device to the primary storage device.

* * * * *